(12) United States Patent
Wu et al.

(10) Patent No.: US 7,251,566 B2
(45) Date of Patent: Jul. 31, 2007

(54) PUMP OFF MEASUREMENTS FOR QUALITY CONTROL AND WELLBORE STABILITY PREDICTION

(75) Inventors: Peter T. Wu, Sugar Land, TX (US); Andrew Hawthorn, Missouri City, TX (US); Tom R. Bratton, Littleton, CO (US); Bikash K. Sinha, West Redding, CT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/308,102

(22) Filed: Mar. 7, 2006

(65) Prior Publication Data

US 2006/0235618 A1 Oct. 19, 2006

Related U.S. Application Data

(60) Provisional application No. 60/594,361, filed on Mar. 31, 2005.

(51) Int. Cl.
*G01V 1/40* (2006.01)
*G01V 3/18* (2006.01)
*G01V 5/04* (2006.01)
*G01V 9/00* (2006.01)

(52) U.S. Cl. .................................... 702/6
(58) Field of Classification Search ............ 702/6
See application file for complete search history.

(56) References Cited

U.S. PATENT DOCUMENTS

| | | | |
|---|---|---|---|
| 4,590,593 A | 5/1986 | Rodney | |
| 4,594,691 A | 6/1986 | Kimball et al. | |
| 4,698,792 A | 10/1987 | Kurkjian et al. | |
| 4,698,793 A | 10/1987 | Wu | |
| 4,703,460 A | 10/1987 | Kurkjian et al. | |
| 4,932,003 A | 6/1990 | Winbow et al. | |
| 5,027,331 A | 6/1991 | Winbow et al. | |
| 5,278,805 A | 1/1994 | Kimball | |
| 5,381,092 A | 1/1995 | Freedman | |
| 5,594,706 A | 1/1997 | Shenoy et al. | |
| 5,687,138 A | 11/1997 | Kimball et al. | |
| 5,740,124 A | 4/1998 | Chunduru et al. | |
| 5,999,484 A | 12/1999 | Kimball et al. | |
| 6,084,826 A | 7/2000 | Leggett, III | |
| 6,176,323 B1 | 1/2001 | Weirich et al. | |
| 6,220,087 B1 | 4/2001 | Hache et al. | |
| 6,237,404 B1 | 5/2001 | Crary et al. | |

(Continued)

FOREIGN PATENT DOCUMENTS

| WO | WO 85/01586 A1 | 4/1985 |
|---|---|---|
| WO | WO 01/046548 A3 | 6/2001 |

*Primary Examiner*—John Barlow
*Assistant Examiner*—Cindy D. Khuu
(74) *Attorney, Agent, or Firm*—Karan Singh; Jaime Costano; Dale Gaudier (57) ABSTRACT

A method for obtaining high-quality well logging data acquired during a drilling operation includes acquiring well logging data during a pump-off period when a mud pump is turned off; and extracting a subset of data from the acquired well logging data, wherein the subset of data corresponds to a quiet period within the pump-off period, wherein the quiet period is substantially free of interference from turning the mud pump on or off.

23 Claims, 5 Drawing Sheets

U.S. PATENT DOCUMENTS

| | | |
|---|---|---|
| 6,378,363 B1 * | 4/2002 | Hache et al. ............ 73/152.46 |
| 6,427,124 B1 | 7/2002 | Dubinsky et al. |
| 6,449,560 B1 | 9/2002 | Kimball |
| 6,581,010 B2 | 6/2003 | Dubinsky et al. |
| 6,611,761 B2 | 8/2003 | Sinha et al. |
| 6,631,327 B2 | 10/2003 | Hsu et al. |
| 6,691,036 B2 | 2/2004 | Blandh et al. |
| 6,714,480 B2 | 3/2004 | Sinha et al. |
| 6,904,365 B2 | 6/2005 | Bratton et al. |
| 2002/0180613 A1 | 12/2002 | Shi et al. |
| 2004/0001398 A1 | 1/2004 | Tang |
| 2004/0006428 A1 | 1/2004 | Hsu et al. |
| 2004/0122595 A1 | 6/2004 | Valero |
| 2004/0145503 A1 | 7/2004 | Blanch et al. |
| 2004/0158404 A1 | 8/2004 | Gaston et al. |
| 2004/0176911 A1 | 9/2004 | Bratton et al. |
| 2004/0199331 A1 | 10/2004 | Mandal |

* cited by examiner

PUMP OFF MEASUREMENTS FOR QUALITY CONTROL AND WELLBORE STABILITY PREDICTION

CROSS-REFERENCE TO RELATED APPLICATIONS

This claims priority of U.S. Provisional Patent Application Ser. No. 60/594,361, entitled "System and Method for Real-Time Subsurface Acoustic Measurements", filed Mar. 31, 2005. This Provisional Application is incorporated by reference in its entirety. This application is related to a co-pending U.S. Patent Application, entitled "System and Method for Detection of Near-Wellbore Alterations Using Acoustic Data", which is assigned to the present assignee and is incorporated by reference in its entirety.

BACKGROUND OF INVENTION

1. Field of the Invention

The present invention relates generally to methods of acoustic measurements and determinations of subsurface parameters in a wellbore and its surrounding formation.

2. Background Art

The oil and gas industry uses various tools to probe the formation penetrated by a borehole in order to locate hydrocarbon reservoirs and to determine the types and quantities of hydrocarbons. For example, resistivity tools may be used to measure the conductivity of the formations, and sonic tools may be used to provide valuable information regarding formation mechanics. Such measurements can be performed with wireline tools, logging-while-drilling (LWD) tools, measurement-while-drilling (MWD) tools, or logging-while-tripping (LWT) tools. In this description, the difference between LWD and MWD is not germane. Therefore, LWD will be used herein to include both LWD and MWD tools or measurements.

LWD tools have become popular in recent years due to their ability to measure fresh formations shortly after a wellbore is drilled. In LWD logging, one or more tools are included in a bottom-hole assembly (BHA) that is disposed right behind the drill bit on the lower end of a drill string. The LWD tool takes measurements while a drilling operation is in progress. While LWD can provide formation measurements before the near wellbore region is significantly contaminated by the drilling fluids, it has its downside. Various techniques used in formation logging are sensitive to the mud flow, weight-on-bit, motion of the drill string, etc. Such undesirable interference can degrade the quality of the LWD data. For example, for LWD sonic measurements, the biggest factor affecting the quality of the logs is the drilling related acoustic noise.

In a typical drilling operation, sections of drill pipes have to be added from time to time to the existing drill string so that the drill bit can reach deeper formations. When addition of drill pipes is needed, the drilling fluid pump is stopped and the drill string is more or less stationary in the bottom hole during these periods, which are referred to as pump-off periods. Pump-off periods are also needed in certain operations, such as fishing operations.

During the pump-off periods, the LWD tools typically continue the measurements because they are programmed to take measurements at preset time intervals before the tool is lowered into a borehole. However, such measurement data are typically discarded because the tool is stationary at a specific depth where measurements have been taken before the pump is shut off. In addition, measurements acquired during the pump-off periods occur when mud telemetry is not available.

Data collection during pump-off periods is disclosed in U.S. Pat. No. 6,237,404 issued to Crary et al. and assigned to the present assignee. This patent is incorporated by reference in its entirety. This patent discloses methods that make use of the pump-off periods to obtain formation measurements that take a long time or that benefit from a quiet environment. Measurements acquired during pump-off periods may contain high-quality data that are otherwise unavailable. Therefore, it is desirable to have methods that make use of such high-quality data.

SUMMARY OF INVENTION

In one aspect, embodiments disclosed herein relate to methods for obtaining high-quality well logging data acquired during a drilling operation. A method in accordance with one embodiment of the invention includes acquiring well logging data during a pump-off period when a mud pump is turned off; and extracting a subset of data from the acquired well logging data, wherein the subset of data corresponds to a quiet period within the pump-off period, wherein the quiet period is substantially free of interference from turning the mud pump on or off.

In another aspect, embodiments of the invention relate to systems for obtaining high-quality logging data from a drilling operation. A system in accordance with one embodiment of the invention includes a processor and at least one memory storing a program having instructions for: acquiring well logging data during a pump-off period when a mud pump is turned off; and extracting a subset of data from the acquired well logging data, wherein the subset of data corresponds to a quiet period within the pump-off period, wherein the quiet period is substantially free of interference from turning the mud pump on or off.

Other aspects and advantages of the invention will become apparent from the following description and attached claims.

DETAILED DESCRIPTION

Embodiments of the invention relate to methods and systems using measurements obtained when the mud pump is turned off (herein referred to as "pump-off periods") to provide indication of qualities of downhole measurements and/or stabilities of wellbores. The pump-off measurements may be from any downhole tools typically used in logging-while-drilling (LWD) or measurement-while-drilling (MWD) measurements. Such tools may include sonic tools, acoustic tools, resistivity tools, nuclear magnetic tools, etc. Such tools are typically disposed in a bottom-hole assembly (BHA) attached near a drill bit on one end of a drill string. While embodiments of the invention may use any of these types of measurements, for clarity of illustration, the following will use acoustic measurements to illustrate the utility of embodiments of the invention.

Figure 1:
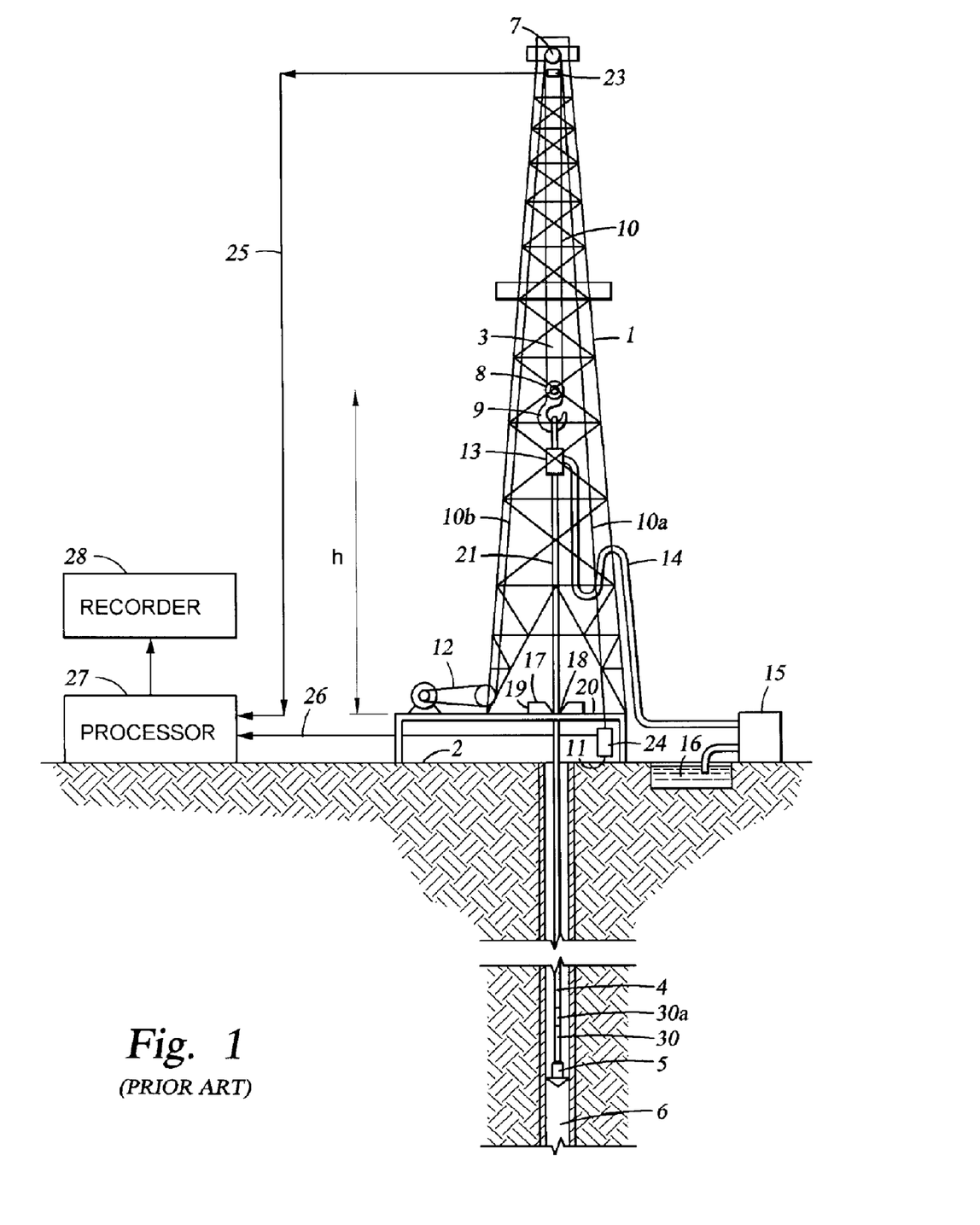
FIG. 1 shows a conventional drilling rig equipped with a drill string with a downhole logging tool in a borehole.

FIG. 1 shows a general illustration of a drilling rig and a drill string with a downhole logging tool in a borehole. The rotary drilling rig shown comprises a mast 1 rising above ground 2 and is fitted with a lifting gear 3. A drill string 4 formed of drill pipes screwed one to another is suspended from the lifting gear 3. The drill string 4 has at its lower end a drill bit 5 for the drilling well 6. Lifting gear 3 consists of crown block 7, the axis of which is fixed to the top of mast 1, vertically traveling block 8, to which is attached hook 9, cable 10 passing round blocks 7 and 8 and forming, from crown block 7, on one hand dead line 10a anchored to fixed point 11 and on the other active line 10b which winds round the drum of winch 12.

Drill string 4 is suspended from hook 9 by means of swivel 13, which is linked by hose 14 to mud pump 15. Pump 15 permits the injection of drilling mud into well 6, via the hollow pipes of drill string 4. The drilling mud may be drawn from mud pit 16, which may be fed with surplus mud from well 6. The drill string 4 may be elevated by turning lifting gear 3 with winch 12. Drill pipe raising and lowering operations require drill string 4 to be temporarily unhooked from lifting gear 3; the former is then supported by blocking it with wedges 17 in conical recess 18 in rotating table 19 that is mounted on platform 20, through which the drill string passes. The lower portion of the drill string 4 may include one or more tools, as shown at 30, for investigating downhole drilling conditions or for investigating the properties of the geological formations. Tool 30 shown is an acoustic logging tool having at least one transmitter and a plurality of receivers spaced therefrom.

Variations in height h of traveling block 8 during drill string raising operations are measured by means of sensor 23 which may be an angle of rotation sensor coupled to the faster pulley of crown block 7. Weight applied to hook 9 of traveling block 8 may also be measured by means of strain gauge 24 inserted into dead line 10a of cable 10 to measure its tension. Sensors 23 and 24 are connected by lines 25 and 26 to processing unit 27 which processes the measurement signals and which incorporates a clock. Recorder 28 is connected to processing unit 27, which is preferably a computer. In addition, the downhole tool 30 may include a processing unit 30a. The downhole computational processing unit 30a and/or the surface processing unit 27 may be used to perform the processing techniques in accordance with embodiments of the invention.

The downhole tool 30 may be a sonic or acoustic tool for making acoustic measurements. Such tools may include one or more sensors and a source, which could be a monopole source, a dipole source, or a quadrupole source. Any sonic or acoustic tool for formation logging known in the art may be used in accordance with embodiments of the invention. Once the measurements are available, they may be processed to provide the desired information regarding the borehole and/or formation. Any processing method (such as STC) known in the art may be used in accordance with embodiments of the invention.

The slowness-time-coherence (STC) method is typically employed to process the monopole LWD sonic waveform signals for coherent arrivals, including the formation compressional, shear and borehole Stoneley waves. See U.S. Pat. No. 4,594,691 issued to Kimball et al., which is incorporated by reference in its entirety, and Kimball et al., Geophysics, Vol. 49 (1984), pp. 264-28. This method systematically computes the coherence (C) of the signals in time windows which start at a given time (T) and have a given window moveout slowness (S) across the array. The 2D plane C(S,T) is called slowness-time plane (STP). All the coherent arrivals in the waveform will show up in the STP as prominent coherent peaks. The compressional, shear, and Stoneley slownesses ($\Delta Tc$, $\Delta Ts$, and $\Delta Tst$) are derivable from the attributes of these coherent peaks.

For slow formations with shear slowness larger than the mud slowness ($V_s < V_f$), the shear headwaves are not directly measurable. In this case, shear slowness is typically measured indirectly from quadrupole mode waveforms and through dispersive STC processing or inversion techniques. For processing dispersive waveforms, the dispersive slowness-time-coherence (DSTC) method is preferred. Description of this method can be found in U.S. patent application Ser. No. 10/904,035, filed Oct. 20, 2004, and U.S. patent application Ser. No. 11/007,402, filed Dec. 8, 2004 (both assigned to the present assignee and incorporated herein by reference in their entirety). See also C. V. Kimball, Geophysics, Vol. 63, No. 2, March-April, 1998; U.S. Pat. No. 5,278,805 (both assigned to the present assignee and incorporated herein by reference in their entirety).

For LWD sonic measurements, a major factor affecting the quality of the logs is the drilling related acoustic noise. However, in a typical drilling operation, there are many time intervals when the drilling operation is temporarily halted, such as during pipe connections, circulation time, or during fishing operations. During such time periods, the mud pump is turned off and the drill string rotation is also stopped, hence the BHA is stationary. Any measurements obtained during such pump-off period (or "quiet period") would be substantially free of interferences arising from the rotating drill string or circulating drilling fluids.

The sonic data (or other logging data) acquired during a pump-off period would have the least amount of noise (or other interference) and, therefore, should produce the best logs. U.S. Pat. No. 6,237,404 (assigned to the present assignee and incorporated herein by reference in its entirety) describes techniques for enabling downhole source activation and data acquisition during drilling pauses. However, while the downhole tools are typically programmed to make measurements during the pump-off periods, such pump-off data are usually ignored by standard real-time processing because pump-off measurements occur during a time period when mud telemetry is not available. In addition, the pump-off measurements are obtained at a depth covered by a previous data frame.

Embodiments of the invention provide methods for extracting high-quality data from measurements acquired during the pump-off periods. Such high-quality data from pump-off measurements may be used for various purposes, such as quality control of other (non-pump-off) measurements and monitoring wellbore conditions or formation properties.

In addition, such pump-off high-quality data may also be used in combination with other measurements to provide better estimates of borehole or formation properties. For example, high-quality sonic data may be used with equivalent circulation density (ECD) measurements, equivalent static density (ESD) measurements, and/or formation pressure measurements to provide a better prediction or estimate of the borehole or formation properties (e.g., borehole integrity) in real time or otherwise. Such other measurements (e.g., ECD, ESD, borehole loading, and pore pressure) may be acquired with conventional downhole tools. The ability to provide accurate borehole or formation properties (e.g., near wellbore formation integrity or stress) will provide drillers with better guidance regarding appropriate mud weight to safely and economically drill and complete the well.

Techniques that use a combination of measurements for monitoring formation stress are described in U.S. Pat. No. 6,904,365, issue to Bratton et al. (assigned to the present assignee and incorporated herein by reference in its entirety). In accordance with methods disclosed in this patent, a series of formation property measurements (e.g., resistivity or acoustic measurements) as a function of different wellbore pressures are acquired. The relationship between the series of formation property measurements and wellbore pressures is then derived and used to predict formation stress.

Pump-off Measurement for Real-Time Quality Control

Typical LWD sonic tools acquire and process data frames at regular time intervals regardless of whether the BHA (bottom hole assembly) is drilling or stationary, or whether the mud pump is on or off. The tools in the BHA are typically powered by a mud turbine/generator in addition to a battery-type power supply. The mud turbine/generator power supply voltage is referred to as the low power tool bus voltage (LTBV). When the mud pump is off, the turbine stops and LTBV will drop to zero. When the mud pump is switched on, the turbine (which is generally located downhole and may be far away from the surface mud pump) will gradually speed up to bring up the LTBV. A controller in the BHA typically monitors the changes in LTBV to determine when mud telemetry is available.

As noted above, measurements acquired during the pump-off periods may include high-quality data. The downhole controller may be used to recognize the pump-off periods and to permit retrieval of such high-quality data. In accordance with methods of the invention, measurements acquired during the pump-off periods may be retrieved and further processed to ensure only high-quality data are used. The further processing may include removal of measurement data acquired during the pump-transient period. The pump-transient period is the period when the turbine is ramping up in response to turning on the mud pump. During the pump-transient period, the LTBV is not at its fully "up" value, and the controller typically considers this as part of the pump-off period. However, measurements acquired during the pump-transient period may be "contaminated" with signals due to machine noises, unstable fluid dynamics, etc.

Figure 2A:
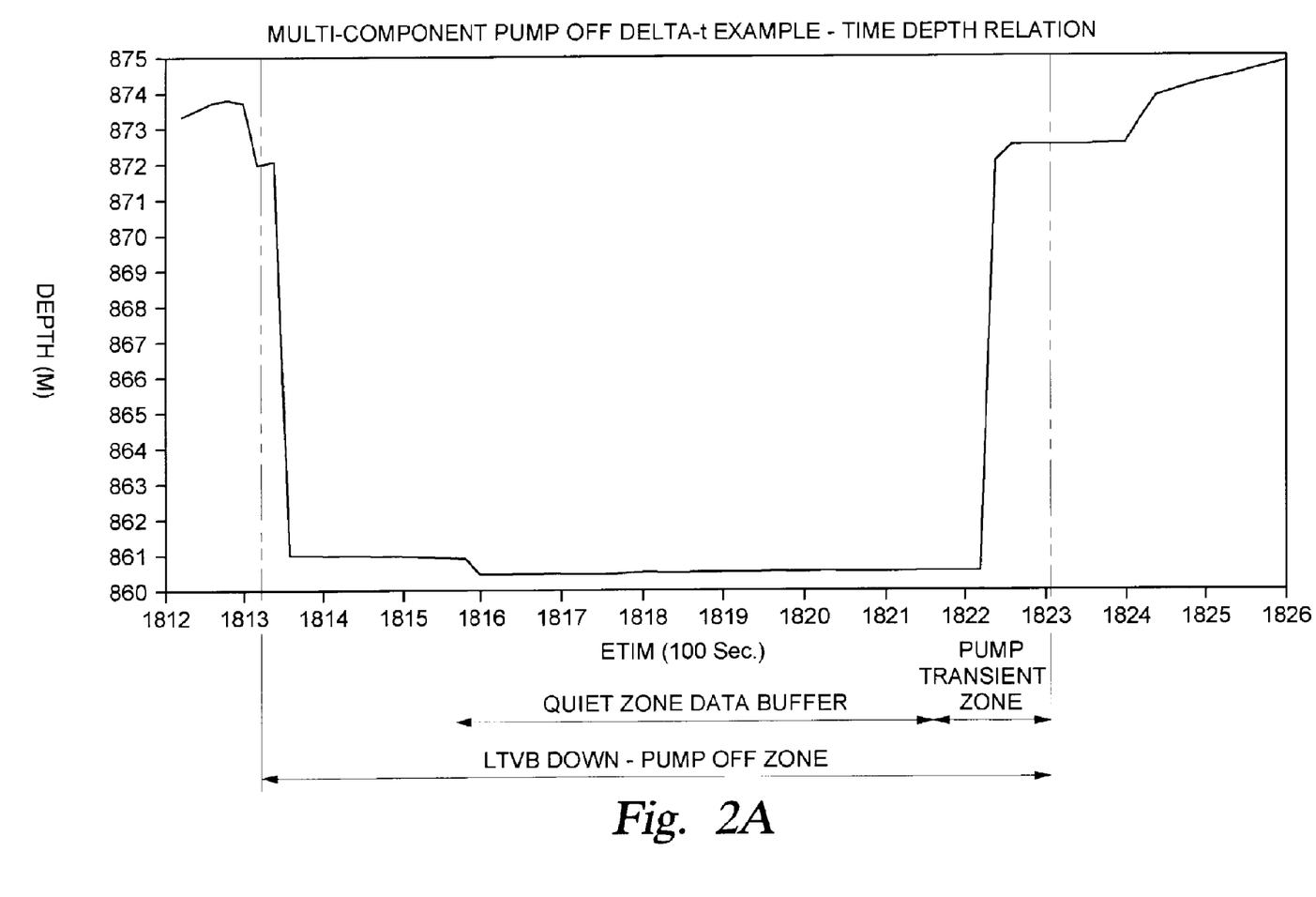
FIG. 2A shows chart illustrating time-depth relationship during a pump-off period in accordance with one embodiment of the invention.

In accordance with embodiments of the invention, the measurements acquired during the pump-transient period are preferably discarded in order to obtain high-quality data. Several methods may be used to recognize the pump-transient periods. For example, the actual recordings of the LTBV, if available, may be used to indicate when this value starts to ramp up. Alternatively, a time-depth relationship (as shown in FIG. 2A) may be similarly used to indicate when the drilling operation is restarted. The pump-transient period may also be simply defined as a selected duration (e.g., 40-60 seconds) before the LTBV is fully up. The selected duration may be based on prior experience with the drill string setup being used.

Once the pump-transient period is recognized, data points corresponding to the pump-transient period may be discarded from the pump-off data points. The remaining data correspond to those acquired during a "quiet period" and should be substantially free of interference. The quiet period data may then be analyzed or extracted for the desired information to include in a telemetry frame for transmission to surface when the telemetry is available.

Figure 2B:
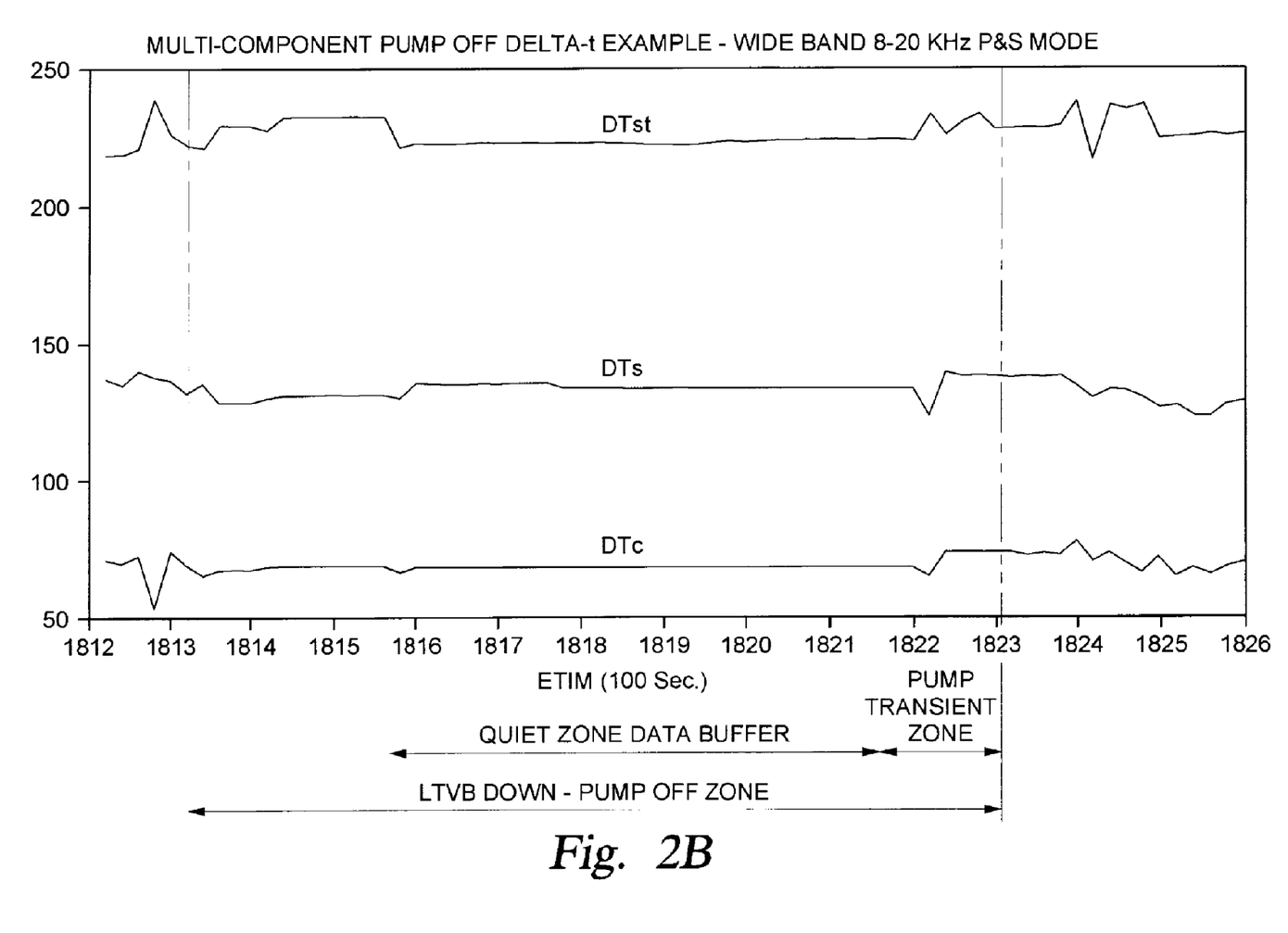
FIG. 2B shows three acoustic measurements during the pump-off period corresponding to that in FIG. 2A in accordance with one embodiment of the invention.
Figure 2C:
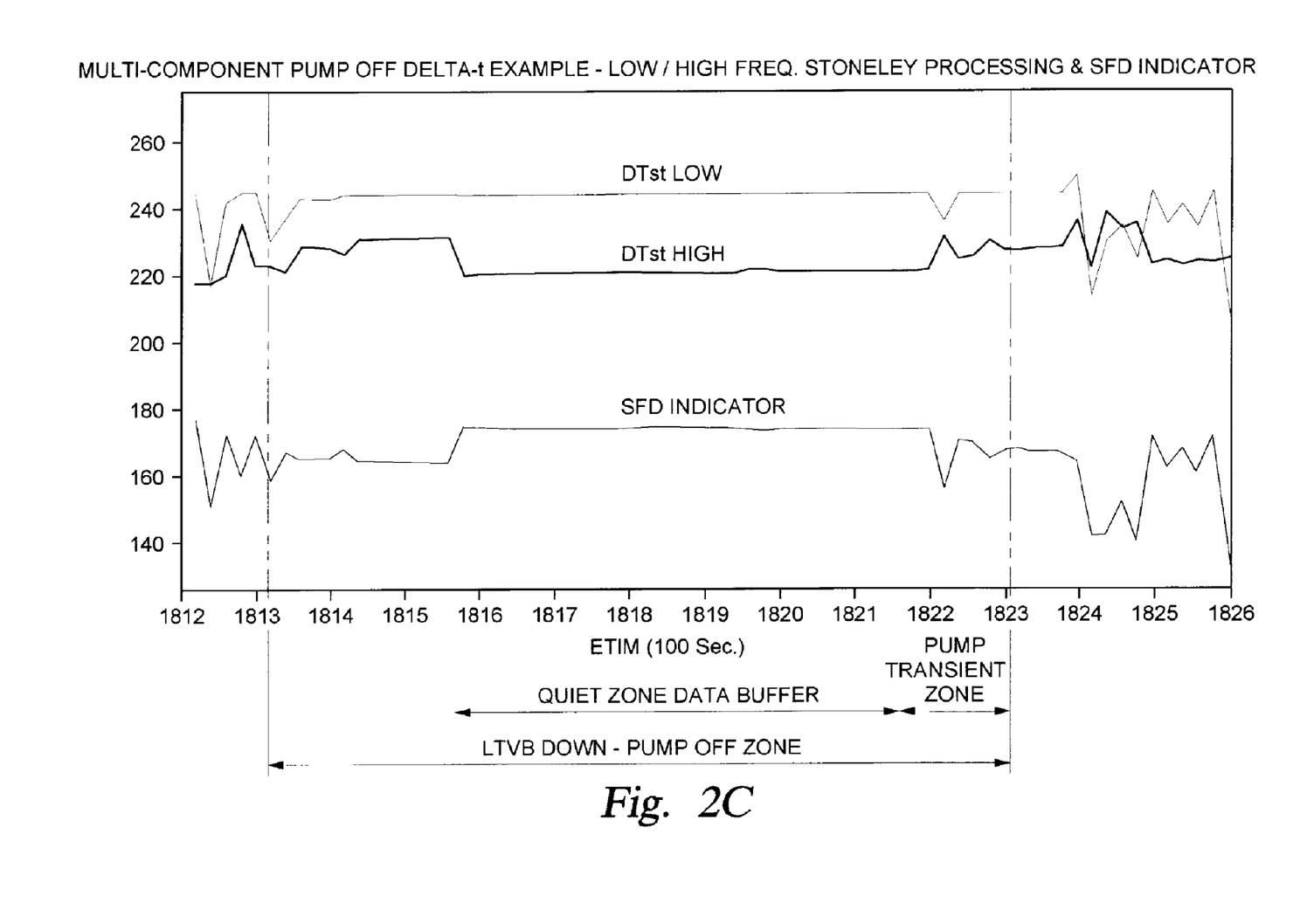
FIG. 2C shows Stoneley slownesses at two different frequencies and an indicator for borehole damage derived from these Stoneley slownesses in accordance with one embodiment of the invention.

FIGS. 2A-2C show an example of the pump-off zone data retrieval and applications in accordance with one embodiment of the invention. FIG. 2A shows a typical time-depth relation during pump-off period (marked as "pump-off zone"). The curve in FIG. 2A depicts the depth of the sensor (or BHA) with respect to time. Two vertical lines shown mark the LTBV off and on times, which delimit the pump-off zone. This relation is available to the downhole processor or at the surface when the data are transmitted uphole. The depth-time relationship curve shows that when the mud pump is turned off and the weight-on-bit is removed for connecting a pipe section, for example, the bit and BHA will move off the bottom hole and the measurement depth (the distance from the top of the well) will decrease. When the mud pump is restarted and the weight-on-bit is reapplied, the measurement depth will increase, which signals an end to the pump-off period. Therefore, the relationship between the measurement depth and time may be used to identify the pump-off period. Although the depth decrease and increase occur within rather short periods of time, these changes do not coincide with the LTBV changes. Nevertheless, this relationship may be used to estimate the pump-transient period and the quiet period within the pump-off period. As illustrated in FIG. 2A, the pump-transient zone (or period) may be defined to start at a pre-selected time period before the depth starts to increase. The pre-selected time period may be based on prior experience, such as 40 to 60 seconds. Similarly, the quiet period may be defined as a certain duration after the depth drops to a reduced value.

FIG. 2A illustrate the use of depth-time relation to identify the quiet period and the pump-transient period. Such approach, i.e., identifying a pump-off period and applying margins to trim a portion from the beginning and a portion from the end of the pump-off period, may also be based on other measurements, such as LTBV measurements.

During the pump-off period, the sensor measurements are typically left running, while the measurement depth remains the same. Therefore, there will be a significant number of (redundant) data points collected for the same formation zone. Such redundant data points can be used to provide more accurate measurements for that particular formation using any statistical methods (to be described below).

FIG. 2B shows measurements for the compressional (DTc), shear (DTs) and Stoneley (DTst) slownesses acquired during the pump-off period corresponding to the same time period shown in FIG. 2A. It is apparent that the measurements are more variable around the time of pump on and off, while those within the quiet period are very consistent. Therefore, by extracting only data points within the quiet period, it is possible to obtain more accurate measurements for the particular formation. The quiet period can be identified as described above.

As noted above, there are many redundant measurements within a quiet period. These redundant measurements may be used in many ways. For example, one may pick any of the redundant data measurements or use the average of these measurements. Alternatively, one may use statistical methods to further improve the accuracy of these measurements. Any statistical method known in the art may be used. For example, one may select the median value for the series of the same measurements as a representative value. The median value is more immune from any outlier effects; therefore, median values are more accurate. In another approach, one may analyze the distribution of a series of the same measurements within the quiet period. The value at the peak of the distribution is more representative of the true value because it is also immune to the outlier effects and small buffer placement error. With any of these approaches, the values obtained (quiet period data) will be more accurate than those obtained during drilling when the pump is on.

Such high-quality quiet period data may find many uses. For example, the data from the quiet period can be used to check the accuracy of data collected for the same zone (or measurement depth) while the drill passes through this zone, e.g., before the pump is turned off. Such spot checks may enable an analyst to apply a correction factor to improve the accuracy of the entire LWD measurements, including zones where no quiet period data are available.

Other applications of the high-quality data may include, for example, well condition monitoring or formation stress detection. FIG. 2C shows one example of using Stoneley wave slowness to monitor near wellbore stability as disclosed in the co-pending application, entitled "System and Method for Detection of Near Wellbore Alterations Using Acoustic Data." A method for monitoring near wellbore alterations disclosed in this co-pending application involves using Stoneley wave slownesses determined with two different frequencies to generate an indicator of near wellbore alterations.

When a borehole is drilled through formations, the drilling action and the mud used during drilling may alter the formation properties around the borehole. Plastic yielding or mechanical damage of the rock may cause near-wellbore softening, which manifests itself as an increase in the Stoneley slowness ($1/V_{st}$) relative to that of the far-field virgin state. In contrast, stress concentrations or overbalance drilling would cause near-wellbore stiffening, which manifests itself as a decrease in the Stoneley slowness relative to that of the far-field virgin state. Thus, Stoneley wave measurements can provide convenient indicators for near wellbore property changes.

However, Stoneley dispersion is also affected by many borehole/formation parameters, such as borehole diameter, the mud compressional slowness ($1/V_f$), mud density, the formation virgin compressional ($V_p$) and shear slownesses ($V_s$), and formation density. If the drilling process creates an annulus of near-wellbore alterations in the formation, the Stoneley dispersion curve will change relative to that of the virgin formation. To detect the near-wellbore alterations in real-time while drilling, it is preferred to use a technique that is largely independent of the borehole/formation parameters because these parameters may not be available in the downhole environment.

A method for monitoring near wellbore alterations may be based on Stoneley wave measurements at two different frequencies. The method is based on observations that higher frequency components of Stonley waves are more sensitive to near wellbore alterations, while the lower frequency components are less sensitive to such alterations, i.e., the lower frequency Stoneley wave components are more representative of a virgin formation. Therefore, a well damage indicator can be convenient derived from a difference between the high-frequency and low-frequency Stoneley wave slownesses.

Accordingly, a method for monitoring near wellbore alterations may include: (1) filtering the Stoneley waveforms with a low-band-pass filter and a high-band-pass filter; (2) processing the filtered signals with a proper algorithm (such as the STC algorithm) to obtain the Stoneley slowness $1/V_{st}$ for the lower-band-pass filtered signals and the high-band-pass filtered signals; and (3) deriving the difference between the Stoneley slownesses in the high and low frequency bands. A change in the Stoneley slowness difference is an excellent indicator of near-wellbore alteration at that depth. Note that the high-frequency signals and the low-frequency signals may also be obtained from separate measurements, rather than from band-pass filtering.

FIG. 2C shows an example of such an approach using the high-quality data acquired during a quiet period. FIG. 2C shows the high (DTst_high) and low frequency (DTst_low) Stoneley slownesses that are derived from measurements acquired during a pump-off period. The high (DTst_high) and low frequency (DTst_low) Stoneley slownesses are then used to derive the Stoneley formation damage (SFD) indicator. The high (DTst_high) and low frequency (DTst_low) Stoneley slownesses and the Stoneley formation damage (SFD) indicator obtained during the quiet period are more accurate than other LWD measurements. While the high (DTst_high) and low frequency (DTst_low) Stoneley slownesses may be used to provide indications of near wellbore and virgin formation mechanics, respectively, the SFD can provide an indication of near wellbore alternations.

Pump-off Measurements for Real-Time Borehole Integrity or Formation Stress Evaluation In addition, the high-quality data obtained during quiet period may be used in combination with other measurements for the detection or monitoring of formation/well properties. For example, the high-quality data (e.g., monopole and quadrupole sonic data) may be used in combination with pressure information (e.g., ECD or ESD) to estimate dynamic elastic moduli or stress of a formation. U.S. Pat. No. 6,904,365, issue to Bratton et al. ("the '365 patent") discloses methods for monitoring well stability or formation stress by acquiring formation property measurements (e.g., acoustic or resistivity measurements) as a function of well fluid pressure variations. For acoustic measurements, a tool equipped with a mono pole, dipole, quadrupole, or high-order source may be used. The well pressure can be varied by changing the pumping rates or by turning on and off the pump.

In a similar approach, the high-quality data obtained in accordance with embodiments of the invention may be used with measurements, such as equivalent circulation density (ECD) and equivalent static density (ESD) of the drilling fluid, from a tool such as APWD™, that provide measurements of borehole loading, or formation pore pressure measurements from a tool such as FPWD™. These data together with a stress evaluation model, e.g., that disclosed in the '365 patent, can provide a better prediction of the state of the borehole integrity. This prediction is highly useful to the driller.

The above description uses acoustic measurements to illustrate embodiments of the invention. One of ordinary skill in the art would appreciate that embodiments of the invention may also use other types of measurements, such as resistivity measurements.

Figure 3:
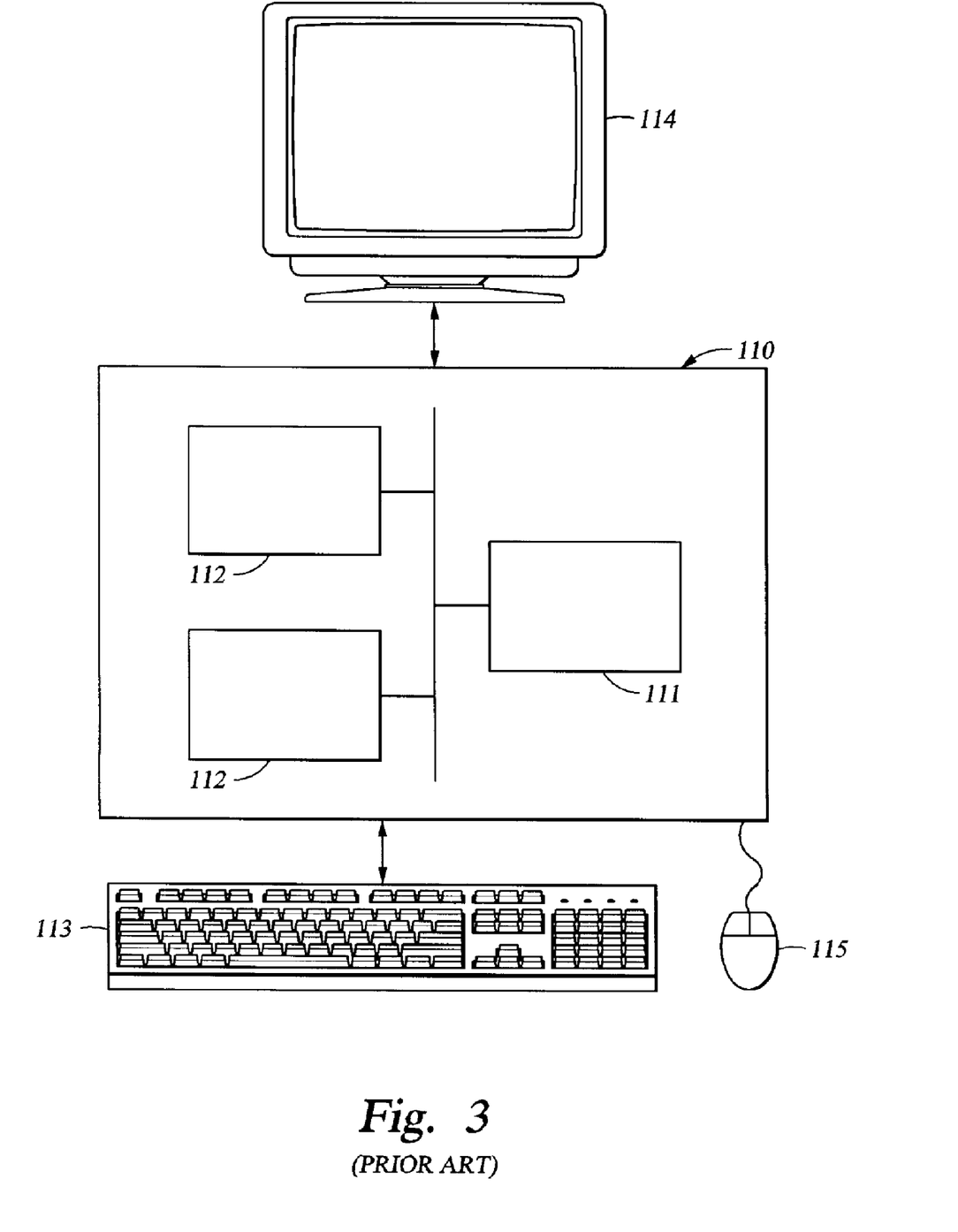
FIG. 3 shows a conventional computer that may be used with embodiments of the invention.

Embodiments of the invention may be implemented with computational units including processors and electronics in a downhole tool or on a surface processor as known in the art. FIG. 3 shows a general purpose computer 110 that may be used with embodiments of the invention. The computer 110 has a processor 111 and one or more memories 112 that may be used to store a program having instructions for performing a method of the invention. The computer may have a display 114 and one or more input devices, such as a keyboard 113 and a mouse 115. Some embodiments may include removable storage means, such as a floppy disk, a CD ROM or other optical disk, a magnetic tape, a read-only memory chip (ROM), and other forms of the kind known in the art or subsequently developed. The program of instructions may be in object code or source codes. The precise forms of the program storage device and of the encoding of instructions are immaterial here.

Advantages of embodiments of the present invention may include techniques for obtaining high-quality well logging data that are otherwise unavailable. Embodiments of the invention also include applications of these high-quality data in the monitoring and detection of well and formation properties. For example, methods of the invention may provide high-quality data that can be used to check the accuracy of other LWD data. Furthermore, such high-quality data may be used to monitor alternations near wellbore or to detect or monitor formation stress.

While the invention has been described with respect to a limited number of embodiments, those skilled in the art will appreciate that other embodiments can be devised which do not depart from the scope of the invention as disclosed herein. For example, embodiments of the invention may be implemented over a broad frequency range of acoustic modes, including wave modes propagating as monopole, dipole, quadrupole, and higher-order modes. Additionally, while the invention has been described primarily with respect to while-drilling systems, those skilled in the art will appreciate that the disclosed techniques may also be implemented with reservoir monitoring, coiled tubing, cross-well, while-tripping, wireline, or other oilfield applications.

What is claimed is:

1. A method for obtaining high-quality well logging data acquired during a drilling operation, comprising:
   acquiring well logging data during a pump-off period when a mud pump is turned off;
   determining a pump-transient period during the pump-off period;
   identifying a quiet period by excluding the pump-transient period;
   extracting a subset of data from the acquired well logging data, wherein the subset of data corresponds to the quiet period within the pump-off period, wherein the quiet period is substantially free of interference from turning the mud pump on or off; and
   utilizing the extracted data to obtain high-quality well logging data for quality control of measurements, monitoring wellbore conditions or monitoring formation properties.

2. The method of claim 1, wherein the pump-off period is identified based on a low power tool bus voltage detected by a controller in a downhole tool.

3. The method of claim 1, wherein the pump-transient period includes a time when the mud pump is turned on or off.

4. The method of claim 1, further comprising deriving a representative data from the subset of data.

5. The method of claim 4, wherein the representative data is a median of data in the subset of data.

6. The method of claim 4, wherein the representative data corresponds to value at a peak in a distribution of data in the subset of data.

7. The method of claim 1, wherein the well logging data comprise acoustic data.

8. The method of claim 7, wherein the acoustic data includes Stonely wave slowness data.

9. The method of claim 8, wherein the Stoneley wave slowness data comprise data acquired with at least two different frequencies.

10. The method of claim 9, further comprising deriving an indicator of near wellbore alteration based on a difference in Stoneley wave slownesses for the at least two different frequencies.

11. The method of claim 1, further comprising using the subset of data to check accuracy of measurement data obtained during the drilling operation, wherein the measurement data include data acquired during a time other than the pump-off period.

12. The method of claim 1, wherein the subset of data is used in combination with at least one other measurement data to derive a formation property.

13. The method of claim 12, wherein the at least one other measurement data comprise well pressure data and the formation property comprise formation stress.

14. A system for obtaining high-quality logging data from a drilling operation, comprising; a processor and at least one memory storing a program having instructions for:
   acquiring well logging data during a pump-off period when a mud pump is turned off;
   determining a pump-transient period during the pump-off period;
   identifying a quiet period by excluding the pump-transient period;
   extracting a subset of data from the acquired well logging data, wherein the subset of data corresponds to the quiet period within the pump-off period, wherein the quiet period is substantially free of interference from turning the mud pump on or off; and
   utilizing the extracted data to obtain high-quality well logging data for quality control of measurements, monitoring wellbore conditions or monitoring formation properties.

15. The system of claim 14, wherein the pump-off period is identified based on a low power tool bus voltage detected by a controller.

16. The system of claim 14, wherein the program further comprising instructions for deriving a representative data from the subset data.

17. The system of claim 16, wherein the representative data is a median of data in the subset of data.

18. The system of claim 16, wherein the representative data corresponds to value at a peak in a distribution of data in the subset of data.

19. The system of claim 16, wherein the well logging data comprise acoustic data.

20. The system of claim 19, wherein the well logging data comprise Stonely wave slowness data acquired with at least two different frequencies, and wherein the program further comprises instructions for deriving an indicator of near wellbore alteration based on a difference in Stoneley wave slownesses for the at least two different frequencies.

21. The system of claim 14, wherein the program further comprising instructions for using the subset of data to check accuracy of measurement data obtained during the drilling operation, wherein the measurement data include data acquired during a time other than the pump-off period.

22. The system of claim 14, wherein the program further comprises instructions for using the subset of data in combination with at least one other measurement data to derive a formation property.

23. The system of claim 22, wherein the at least one other measurement data comprise well pressure data and the formation property comprise formation stress.

* * * * *